Patented May 28, 1946

2,401,155

UNITED STATES PATENT OFFICE 2,401,155

PROCESS FOR PRODUCING CONDENSATION PRODUCTS

Winfrid Hentrich, Rodleben, near Dessau-Rosslau, and Erik Schirm, Dessau, Germany; vested in the Alien Property Custodian No Drawing. Application February 19, 1941, Serial No. 379,644. In Germany January 29, 1940

4 Claims. (Cl. 260—2)

This invention relates to a process for producing condensation products having at least three acyl sulfamide groups in the molecule. More particularly it relates to the production of tanning principles having at least three acyl sulfamide groups in the molecule by condensing organic acyl halogenides with organic sulfamides.

The principal object of this invention is to provide industry, particularly the leather and textile industry with an effective class of tanning principles for tanning purposes for reserving wool and for making colorlakes.

It has been found that valuable condensation products are obtained by producing acyl sulfamides containing no less than three acyl sulfamide groups in the molecule, in converting the halogenides or anhydrides of organic sulfonic acids or carboxylic acids with aromatic sulfamides, having sulfamide groups non-substituted at the nitrogen, in the presence of alkaline agents.

Such condensation products are obtained in a simple way by (a) the condensation of one mol of a tri- or tetrasulfo-chloride with three or four mols respectively of a monosulfamide and (b) the condensation of one mol of a tri- or tetrasulfamide with three or four mols respectively of a monosulfo-chloride. But one may also condense e. g. one mol of a disulfonic chloride with one mol of a disulfamide or two mols of a trisulfochloride with three mols of a disulfoamide or vice versa three mols of a disulfochloride with two mols of a trisulfamide and so on. In the latter cases high molecular condensation products are obtained with an indefinite number of disulfimide groups.

Among the sulfochlorides applicable according to the present invention are named e. g. benzenesulfochloride, benezene-1,3 - disulfochloride, p-toluenesulfochloride, toluene-2,4 - disulfochloride, p - chlorobenzenesulfochloride, chlorobenzene-2,4-disulfochloride, m - nitrobenzene-sulfochloride, phenol-2,4,6 - trisulfochloride, benzoic acid-m-sulfochloride, salicylic acid - sulfochloride, the various di- and tri-sulfochlorides of the naphthalene, naphthalene-1,3,5,7-tetrasulfochloride, pyrene-3,5,8,10-tetrasulfochloride, carbazoltetrasulfochloride, the sulfochlorides of the diphenyl and the like. As carboxylic acid derivatives there are to be considered e. g. acetic acid anhydride, acetyl bromide and the chlorides of the higher fatty acids, phosgene, oxalyl chloride, adipic acid chloride, benzoyl chloride, iso- and terephthaloyl chloride, etc.

As sulfamides one may apply e. g. all the sulfamides obtainable from the aforementioned sulfochlorides by means of ammonia. In certain cases it is unnecessary to isolate the sulfamides i. e. if poly sulfochlorides are used as initial materials. One may simply cause the reaction of same upon ammonia observing, however, that for one sulfochloride group there is present less than one mol of ammonia and in this way also high molecular condensation products are obtained with an indefinite number of disulfimide groups, eventually besides sulfamide groups i. e. when for two sulfochloride groups more than one mol of ammonia was applied. The sulfamides may also contain amino groups besides the substituents that are possible with the halogenides or anhydrides of the sulfonic and carboxylic acids, such as alkyl, halogen, hydroxy, alkoxy and nitro groups. In this case at the condensation also acyl amide groups are formed besides the acyl sulfamide groups which are capable of improving advantageously the properties of the condensation products.

A further manner of carrying out the present process consists in taking N-acyl-sulfamides which contain besides the imide hydrogen at least one exchangeable hydrogen atom linked to O, N or S, and in condensing same with organic compounds possessing reactive halogen atoms, wherein the components are to be selected in such a manner that the obtained condensation products contain no less than three acyl sulfamide groups.

As acyl sulfamides of the aforementioned kind are to be named e. g. the m,m'-dihydroxy-dibenzene-disulfimide, the p-mercaptol-benzene-p'-toluene-disulfimide, the N-(p'-amino-benzene-sulfonyl)-benzamide, the N-(m'-aminobenzoyl)-p-toluene-sulfamide, the m,m'-diaminodibenzene-disulfimide. The compounds to be applied as second components with reactive halogen atoms may be characterised by the following examples: sulfochlorides, either mono- or polysulfochlorides of the aromatic series, chlorides of mono- and poly-carboxylic acids such as benzoyl chloride, phosgene, adipic acid chloride, isophthaloyl chloride, further halogen-methyl compounds, such as benzyl chloride, menaphthyl chloride, o-, m- or p-xylylene-dibromide, 4,6-di-(chloromethyl) - 1,3 - xylol or 2,4 - di(chloromethyl)-anisol, further aromatic compounds halogenated in the nucleus with reactive halogen atoms, such as the 2,4-dinitro-chlorobenzene, the 1,3-dinitro-2,4,5-trichlorobenzene, finally heterocyclic compounds with the grouping —C(Hal)=N— preferably twice or three times in the molecule such as 2,4-dichloro-pyrimidine, 2,4-dichloro-quinazoline or cyanuric chloride.

It has been found that when in the afore-described processes in first and/or second place components are applied containing or forming monoaryl substituted sulfamide groups it is unnecessary that the condensation products contain at least three acyl sulfamide groups. The number of the acyl sulfamide groups may in those cases even be only two or one as far as the sum of the acyl sulfamide and sulfamide groups is no less than three.

The components employed in first and/or second place may contain watersoluble rendering groups such as the sulfonic acid, sulfuric acid ester, carboxylic, polyglycol ether, quaternary ammonium groups, etc.

The products made according to the present invention are able to transform animal hides into leather and are valuable tanning principles. They may also be used as reserving agents for wool against the dyeing with direct cotton dyestuffs and for making colorlakes by the conversion with basic dyestuffs.

Example 1

513 parts by weight of p-toluol-sulfamide are dissolved while adding 130 parts by weight of sodium hydroxide in 2500 parts of water. To this solution at room temperature 424 parts by weight of napthalene-1,3,5-trisulfochloride are added which are stirred together with 200 parts of water to form a fine paste; then the mixture is stirred at 25 to 30° C., and as soon as the alkaline reaction diminishes soda lye is added so that the mixture remains constantly alkaline to phenolphthaleine. If at the temperature mentioned the conversion begins to cease the mixture is warmed up at first to 50° C. and, if the reaction does not advance, one continues warming up to 90–95° C. and keep this temperature until the reaction remains alkaline for ½ to 1 hour, which indicates the end of the conversion. Then the mixture is cooled down to 60° C., common salt and hydrochloric acid for acidifying are added, till Congo paper dyes blue, whereupon one continues cooling down to room-temperature and filters off the resinous amorphous condensation product. It dissolves easily in hot water and the solution standardized to a pH-value of 3 to 4.5, may now immediately be employed for tanning purposes.

Example 2

444 parts by weight of naphthalene-1,3,5,7-tetrasulfamide are suspended in 3000 parts of water and dissolved by an addition of 170 parts by weight of sodium hydroxyde. Then 1100 parts by weight of 3,4-dichlorobenzene-sulfochloride, pasted with water, are introduced into the said solution at room temperature. By a gradual addition of soda lye and an increasing of the temperature the condensation is performed quite similarly as described in Example 1. Also the isolating of the condensation product from the ready made reaction mixture can be done to the method shown in Example 1 and the result is also an easily watersoluble resin with tanning properties.

Instead of the 3,4-dichlorobenzene-sulfochloride one may likewise employ the equivalent amount of benzoyl chloride. In this case the method distinguishes itself from the indicated one merely by the fact that the condensation is begun at temperatures near to the ice-point and only after an addition of the whole amount of benzoyl-chloride it is slowly warmed up.

Example 3

331 parts by weight of phenol-2,4,6-trisulfamide are dissolved while adding 130 parts by weight of sodium hydroxide in 2000 parts of water. 435 parts by weight of toluene-2,4-disulfochloride are finely ground with water and the paste is added to the above solution at room temperature. Then one proceeds exactly as described in the Examples 1 and 2 and obtains likewise a resinous tanning substance but of an undefinite, high molecular weight.

If less than 435 parts by weight of toluene-disulfochloride—e. g. 290 parts by weight only—for 331 parts by weight of phenol trisulfamide are used, similar high molecular bodies are obtained which, however, besides the disulfimide groups contain also free sulfamide groups and form also good tanning principles.

Example 4

365 parts by weight of naphthalene-1,3,6-trisulfamide are dissolved in 2000 parts of water while adding 130 parts by weight of sodium hydroxide. Into this solution phosgene is introduced at 10 to 20° C., till an increase of weight by 100 parts by weight is attained. During the introduction the reaction of the solution is kept permanently alkaline by a gradual addition of soda lye. Then for some time the mixture is warmed up to 50° C., is acidified and separated out by salt. The precipitation is filtered in the cold and dried. The thus obtained resin in its high molecular structure resembles the product of the preceding example. It is a very good tanning principle. The amount of the applied phosgene may be increased up to about 150 parts.

Instead of phosgene one may likewise apply, with the same satisfactory result, the equal weight amount of chlorocarbonic acid-trichloromethyl ester.

Example 5

424 parts by weight of a technical mixture of the naphthalene-trisulfochloride-1,3,6 and -1,3,7 are pasted with water and the paste is stirred, at about 0 to 5° C., into a solution of 80 parts by weight of ammonium chloride in 800 parts of water. Then slowly and at the same temperature, 60 parts by weight of sodium hydroxide are introduced in the form of a 30% solution, whereupon stirring is continued for one hour at 0 to 5° C. Now the temperature is raised up to 20° C. and a further amount of soda lye is added, as soon as the phenolphthalein alkaline reaction disappears and the condensation is accomplished exactly as described in Example 1. The working up of the precipitation is done as per Example 1 and there results a tanning substance which according to its constitution resembles the product obtained as per Example 3.

If in this example an increasing amount of ammonium chloride up to approximately 107 parts by weight is used, high molecular products are obtained which besides the disulfimide groups contain non-substituted sulfamide groups to an enhanced extent (see Example 3, 2nd paragraph).

Example 6

326 parts by weight of m-amino-benzene-p'-toluene-disulfimide (made by condensation of m-nitrobenzene-sulfo-chloride with p-toluene-sulfamide in the presence of soda lye, and reduction of the nitro group) are dissolved while adding 40 parts by weight of sodium hydroxide in 2000 parts of hot water and the solution is cooled down to 2° while well stirring, during this process the sodium salt of the disulfimide crystallises out partly. Into this suspension, at 2 to 5° C. a solution of 65 parts by weight of cyanuric chloride in 250 parts by volume of acetone is stirred in, or the cyanuric chloride is immediately introduced in a finely pulverized form. One continues with stirring at 2 to 5° C. for one hour, whereupon the liquid is carefully neutralised with sodium bicarbonate, till Congo paper is dyed but just blackish, then the temperature is raised to 20° C. and one continues adding sodium bicarbonate as soon as the liquid begins to turn Congo acid; but at the same time one takes care that there remains a distinctly litmus-acid reaction. As soon as at room temperature the splitting off of acid ceases, one warms up to 40-50° C. whereat a clear solution is obtained and at this temperature by a careful addition of sodium bicarbonate a constantly litmus-neutral reaction is formed. Then the mixture is warmed up to 90-95° C. and is stirred at this temperature for one hour, whereupon so much soda is slowly aded that the solution remains finally slightly litmus-alkaline. Then one cools down to 50° C., acidifies with hydrochloric acid till Congo paper is dyed blue, whereupon the cooling down to room temperature is continued; now the precipitated and still plastic resin is separated from acid water and dried at 100° C. The output is quantitative. The reddish powder obtained after the pulverizing of the dry substance dissolves easily in water with a strongly acid reaction. The solution shows tanning properties.

*Example 7*

At first one proceeds exactly as in the preceding example, but increases the amount of the cyanuric chloride up to 98 parts by weight. After a constantly litmus-neutral reaction is attained at 40 to 50° C., a solution of 82 parts by weight of m,m'-diamino-dibenzene-disulfimide and 10 parts by weight of sodium hydroxide in 250 parts of water are added and the temperature is increased to 90° C. The further process is exactly as before. The obtained condensation product distinguishes itself externally scarcely from that of the Example 6. Its constitution formula is as follows:

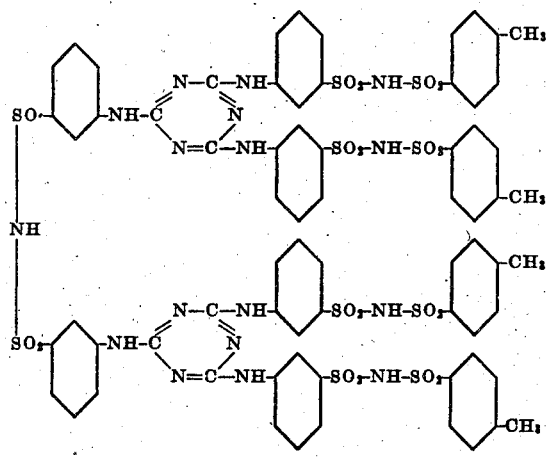

*Example 8*

483 parts by weight of metanilyl-metanilyl-metalinic acid of the formula

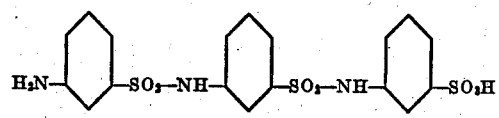

are dissolved while adding 40 parts by weight of sodium hydroxide in 2000 parts of water. On the other hand a solution of 98 parts by weight of cyanuric chloride in 400 parts by volume of acetone are introduced, while energetically stirring, into 1300 parts of iced water. To the thus obtained suspension the above amino-acid-solution is slowly added without exceeding the temperature of 5° C. During this addition the suspension is transformed into a clear solution. One continues stirring for one hour at ice-temperature, then warms up to 20° C. and keeps this temperature also for one hour. Now sodium bicarbonate is carefully added, until Congo paper will be dyed but blackish and this reaction is maintained for a further hour. Then one warms up to 40-50° C. and by a further addition of bicarbonate one makes up to constant Congo-neutral till litmus-acid. By means of a diazotizing-test one determines that no remarkable amounts of unbound amino acid are present in the solution, then one adds a solution of 82 parts by weight of m,m'-diamino-dibenzene-disulfimide made according to Example 7, whereupon the mixture is warmed up to 90-95° C. At this temperature a constant slightly litmus-alkaline reaction after one hour's stirring by an addition of soda is made. As soon as a diazotising-test indicates the end of the conversion the mixture is cooled down to 60° C. is made strongly Congo-acid by addition of hydrochloric acid and is cooled down to room temperature. The resin precipitated in the warmth as plastic mass solidifies, is pulverized, sharply sucked off and dried at 100° C.; the output is quantitative. The thus obtained reddish powder is an excellent individual tanning substance and supplies a white, well filled flexible leather of a great fastness to light and a resistance to tearing.

A similarily valuable tanning substance is obtained, if instead of the metanilyl-metanilyl-metanilic acid one takes the N-(metanilyl-metanilyl-)benzoic acid-m-sulfamide of the formula

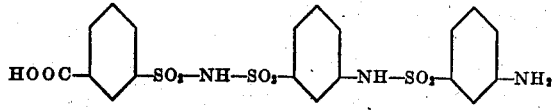

and performs for the rest the condensation exactly in the afore-described manner.

*Example 9*

424 parts by weight of naphthalene-1,3,5-trisulfochloride are ground with water to form a fine paste, which is introduced at room temperature into a solution of 524 parts by weight of the dry sodium salt of the m,m'-diamino-dibenzene-disulfimide in 2500 parts of water. After some stirring the mixture turned acid is neutralized with soda lye; then, as soon as the separation of acid diminishes, the temperature is raised gradually and finally up to 90-95° C., and by a careful addition of soda lye or soda the reaction is maintained litmus-neutral as far as possible. Finally one renders slightly litmus-alkaline and, if this reaction lasts for ½ to 1 hour without a further alkali-addition, the mixture is made strongly Congo-acid with hydrochloric acid after cooling down to about 60° C. The further working up is done as per Example 1.

In this case in approximately a quantitative output a resinous condensation product of excellent tanning-properties is obtained.

Example 10

69 parts by weight of sodium are dissolved in 2000 parts by weight of tetrahydrofurfurylalcohol (or glycol-monoethyl ether). To this solution 329 parts by weight of m,m'-dioxydibenzene-disulfimide (obtained from the corresponding diamino-compound by tetrazotising and warming of the aqueous bisdiazonium-salt solution) are added, then the mixture is warmed up, whereby the imide dissolves while forming the trisodium compound. The solution is now cooled down to room temperature and a solution of 203 parts by weight of 4,6-dichloro-methyl-1,3-xylol is stirred in. By warming up on the water bath the conversion is finished. Now the organic solvent is distilled off under a strongly diminished pressure and the residue is taken in water. From the aqueous solution the high molecular condensation product, the "structure element" of which is

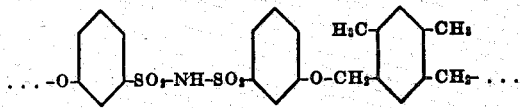

is precipitated as resin when acidifying with mineral acids. The precipitate is soluble in water and possesses tanning properties; the neutralised solution supplies colorlakes with the salt solutions of basic dyestuffs.

Example 11

172 parts by weight of metanil amide are dissolved in 3000 parts of water while adding 45 parts by weight of sodium hydroxide. Into this solution all at once at room temperature a paste made of 413 parts by weight of diphenyl-p,p'-disulfochloride and water by intimate grinding is introduced. The condensation is now carried out exactly as described in Example 1, and also the working up of the reaction mixture is done in the same way. There results a reddish powder of the properties of the products obtained in the preceding examples. Constitutionally the body is formed by a multiple linking up of the following "structure element":

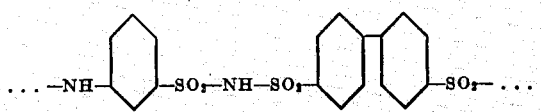

Example 12

133 parts by weight of 4-hydroxy-5-methyl-benzene-1,3-disulfamide (obtained from the corresponding disulfo-chloride in a benzolic or ethereal solution by introducing ammonia-gas while cooling) are dissolved in 1500 parts of water while adding 45 parts by weight of sodium hydroxide. Now at room temperature 222 parts by weight of m-nitrobenzene-sulfochloride pasted with water is added, whereupon the condensation is performed as per Example 1, by maintaining the reaction mixture constantly alkaline by means of soda lye and gradual increasing of the temperature. As soon as at 90° C. a clear solution is obtained which remains slightly alkaline hydrochloric acid is carefully added till the reaction becomes litmus-acid, whereupon while stirring the solution is poured in a boiling mixture of 200 parts by weight of pig-iron chips, 1000 parts of water and 10 parts by weight of glacial acetic acid. When the reduction is terminated the reaction mixture is made alkaline by means of soda and filtered.

In the filtrate the amount of amino compound is determined by means of a standardized nitrite solution and after cooling for each gramme equivalent of amino compound 231 gr. of a technical mixture of the two isomere tetrahydronaphthalenesulfochlorides are added which were ground with water to form a paste. The second condensation is performed exactly as the first and the final product consisting predominantly of a compound of the following constitution-formula:

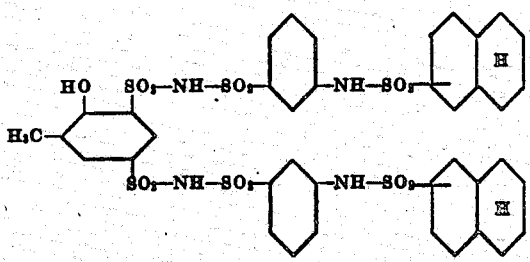

is separated in the usual way from the reaction mixture by acidifying, then filtered and dried. The obtained resin is dissolved in water under an addition of buffer substances such as sodium acetate or sodium bicarbonate, so that a pH-value of about 3 to 4.5 is obtained. This solution has excellent tanning properties.

Example 13

312 parts by weight of m-aminobenzene-benzene-disulfimide are dissolved while warming in 1500 parts of water under addition of 40 parts by weight of sodium hydroxide. To the solution cooled down to 20° a paste is added which is prepared by stirring 244 parts by weight of m-nitrobenzene-sulfochloride with 125 parts of water. The acid being free is neutralized by gradually adding soda lye. Now the mixture is slowly heated to 90–95° and if necessary neutralized with soda lye once more. When it was determined by means of a diazotizing test that no discernable amounts of amino compounds are present 300 parts by weight of sodium chloride are added and the condensation product is precipitated by acidifying with hydrochloric acid at 70°. After cooling the precipitated liquid resin is separated from the acid water and is dissolved in 800 parts of hot water under addition of a sufficient amount of soda lye for neutralizing.

Now for the reduction of the nitro group the hot solution is poured in a boiling mixture of 200 parts by weight of pig-iron chips, 750 parts of water and 7.5 parts by weight of glacial acetic acid, the iron is precipitated by soda and in the filtrate the amount of the amino compounds is determined.

Hereupon the obtained amino compound is condensed with m-nitrobenzene sulfochloride in the above described manner and the nitro compound thus formed is reduced with iron and acetic acid. The solution from which the iron is separated off contains the metanilyl-metanilyl-methanilyl-benzene sulfamide of the following structural formula

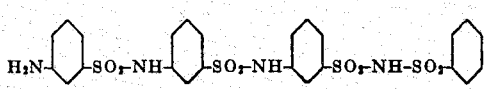

in the form of the mono sodium salt. The output related to the metanilyl-benzene sulfamide used amounts to 80% of the theory. The weight of the soda alkaline solution may amount to 2400–2500 parts by weight.

For the condensation with cyanuric chloride to the solution carefully hydrochloric acid is added till the reaction is only in traces litmus alkaline and the solution is cooled with ice. A semiliquid resin is precipitated from which the aqueous solution is poured off. In the solution 53 parts by weight of cyanuric chloride dissolved in 230 parts by volume of acetone are stirred in at 0–5°. Now the resin is added, whereupon the solution is made weakly litmus alkaline by addition of sodium bicarbonate. The solution is slowly warmed up to 90° while keeping the reaction of the mixture litmus alkaline by gradually adding sodium bicarbonate. Hereupon at 90–95° soda is added until a permanent weakly litmus alkaline reaction is attained. Now the solution is cooled down to 70° and the resin is precipitated with hydrochloric acid. The resin which solidifies in the cold, is pulverized, sharply sucked off and dried at 100°. The thus obtained tanning material contains only a small amount of ash and is considerably soluble in hot water. The solubility is increased by the addition of sodium acetate.

We claim:

1. The process of making a condensation product which consists in stirring together one part of cyanuric chloride with about 3½ parts of amino-benzene-aryl disulphimide in the cold, neutralizing the liquid with alkali during the reaction, heating with additional alkali, adding diamino-dibenzene disulphimide, reheating with additional alkali, cooling and precipitating the compound with an inorganic acid.

2. A higher molecular sulphamide compound containing a syanur nucleus having each of two carbon atoms thereof connected to the amino group of an amino-benzene-aryl disulphimide the remaining carbon atom is connected to an amino group of diamino-dibenzene disulphimide.

3. A higher molecular sulphamide compound containing a cyanur nucleus having each of two carbon atoms thereof connected to the amino group of an aminobenzene-toluene disulphimide the remaining carbon atom is connected to an amino group of diamino-dibenzene disulphimide.

4. A higher molecular sulphamide compound containing two cyanur nuclei each having two carbon atoms thereof connected to the amino group of an aminobenzene-toluene disulphimide and the remaining carbon atoms interconnected through the amino groups of diamino-dibenzene disulphimide.

WINFRID HENTRICH.
ERIK SCHIRM.